United States Patent
Huang et al.

(10) Patent No.: US 9,038,083 B2
(45) Date of Patent: May 19, 2015

(54) VIRTUAL MACHINE PROVISIONING BASED ON TAGGED PHYSICAL RESOURCES IN A CLOUD COMPUTING ENVIRONMENT

(75) Inventors: Alex Huang, Cupertino, CA (US);
Chiradeep Vittal, Cupertino, CA (US);
William Chan, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 306 days.

(21) Appl. No.: 13/369,930

(22) Filed: Feb. 9, 2012

(65) Prior Publication Data

US 2013/0212576 A1    Aug. 15, 2013

(51) Int. Cl.
| | |
|---|---|
| G06F 9/46 | (2006.01) |
| G06F 9/455 | (2006.01) |
| G06F 12/00 | (2006.01) |
| G06F 15/177 | (2006.01) |
| G06F 9/50 | (2006.01) |
| G06F 9/44 | (2006.01) |

(52) U.S. Cl.
CPC .......... *G06F 9/45558* (2013.01); *G06F 9/4445* (2013.01); *G06F 9/5072* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,577,722 B1 * | 8/2009 | Khandekar et al. | ........... 709/220 |
| 8,095,929 B1 | 1/2012 | Ji et al. | |
| 2010/0162259 A1 | 6/2010 | Koh et al. | |
| 2011/0225277 A1 | 9/2011 | Freimuth et al. | |
| 2011/0296370 A1 * | 12/2011 | Ferris et al. | ................... 717/100 |

OTHER PUBLICATIONS

Krsul I et al.: "VMPlants: Providing and Managing Virtual Machine Execution Environments for Grid Computing", Supercomputing, 2004. Proceedings of the ACM/IEEE SC2004 Conference Pittsburgh, PA, USE 06-12 Nov. 2004, Piscataway, NJ, USA, IEEE, Nov. 6, 2004, pp. 7-7. XP010780332, DOI: 10.1109/SC.2004.67, ISBN: 978-0-7695-2153-4, the whole document.
International Search Report, corresponding PCT Application PCT/US2013/025311 dated May 10, 2013.

* cited by examiner

*Primary Examiner* — Meng An
*Assistant Examiner* — Bing Zhao
(74) *Attorney, Agent, or Firm* — Banner & Witcoff, Ltd.

(57) ABSTRACT

A cloud system may create physical resource tags to store relationships between cloud computing offerings, such as computing service offerings, storage offerings, and network offerings, and the specific physical resources in the cloud computing environment. Cloud computing offerings may be presented to cloud customers, the offerings corresponding to various combinations of computing services, storage, networking, and other hardware or software resources. After a customer selects one or more cloud computing offerings, a cloud resource manager or other component within the cloud infrastructure may retrieve a set of tags and determine a set of physical hardware resources associated with the selected offerings. The physical hardware resources associated with the selected offerings may be subsequently used to provision and create the new virtual machine and its operating environment.

18 Claims, 7 Drawing Sheets

| RESOURCE_ID | TYPE | TAG_ID | DESCRIPTION |
|---|---|---|---|
| Host A | HOST | 1 | Dual Core Proc. |
| Host B | HOST | 2 | Quad Core Proc |
| Host A | HOST | 1 | 3M Cache |
| Host B | HOST | 2 | 6M Cache |
| Host B | HOST | 3 | Data Room 1 |
| Host C | HOST | 4 | Data Room 2 |
| Host C | HOST | 5 | Dell |
| Net_Element_A | NET | 3 | Cisco Firewall |
| Net_Element_B | NET | 6 | Juniper Firewall |
| Storage A | STOR | 2 | SSD |
| Storage B | STOR | 7 | HDD |
| . . . | | | |

| OFFERING_ID | TAG_ID |
|---|---|
| OFFER_1 | 2 |
| OFFER_2 | 1 |
| OFFER_2 | 6 |
| OFFER_3 | 1 |
| OFFER_3 | 5 |
| OFFER_4 | 5 |
| . . . | |

705c — Large Virtual Machine [4 GHz CPU, 4 GB Mem]   $.50 per hour   [Select]
High Performance Package with Quad-Core Procs. and larger cache 710c — Large Virtual Machine [4 GHz CPU, 4 GB Mem]   $.40 per hour   [Select]
Standard Package with Dual-Core Procs.
Juniper Network Hardware

VIRTUAL MACHINE PROVISIONING BASED ON TAGGED PHYSICAL RESOURCES IN A CLOUD COMPUTING ENVIRONMENT

FIELD

This application generally relates to creating and managing virtual machines. In particular, this application relates to provisioning virtual machines on specific physical resources in a cloud computing environment using physical resource tags.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system. Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing environments may service multiple customers with private and/or public components, and may be configured to provide various specific services, including web servers, security systems, development environments, user interfaces, and the like.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe systems and methods for provisioning and creating virtual machines and other offerings in a cloud computing environment using tags (e.g., electronic labels) associated with physical hardware resources. In one example, a set of tags is created and stored in a database or other storage describing associations between cloud computing offerings and specific physical resources in the cloud computing environment. One or more offerings corresponding to various combinations of computing services, storage, networking, and other hardware or software resources, may be presented to cloud customers. After a customer selects one or more cloud computing offerings, a cloud resource manager or other component within the cloud system may retrieve a set of tags and determine a set of physical hardware resources associated with the selected offerings. Then, the new virtual machine and its operating environment may be provisioned and created using the physical hardware resources associated with the selected offerings.

BRIEF DESCRIPTION OF THE DRAWINGS

Figure 1:
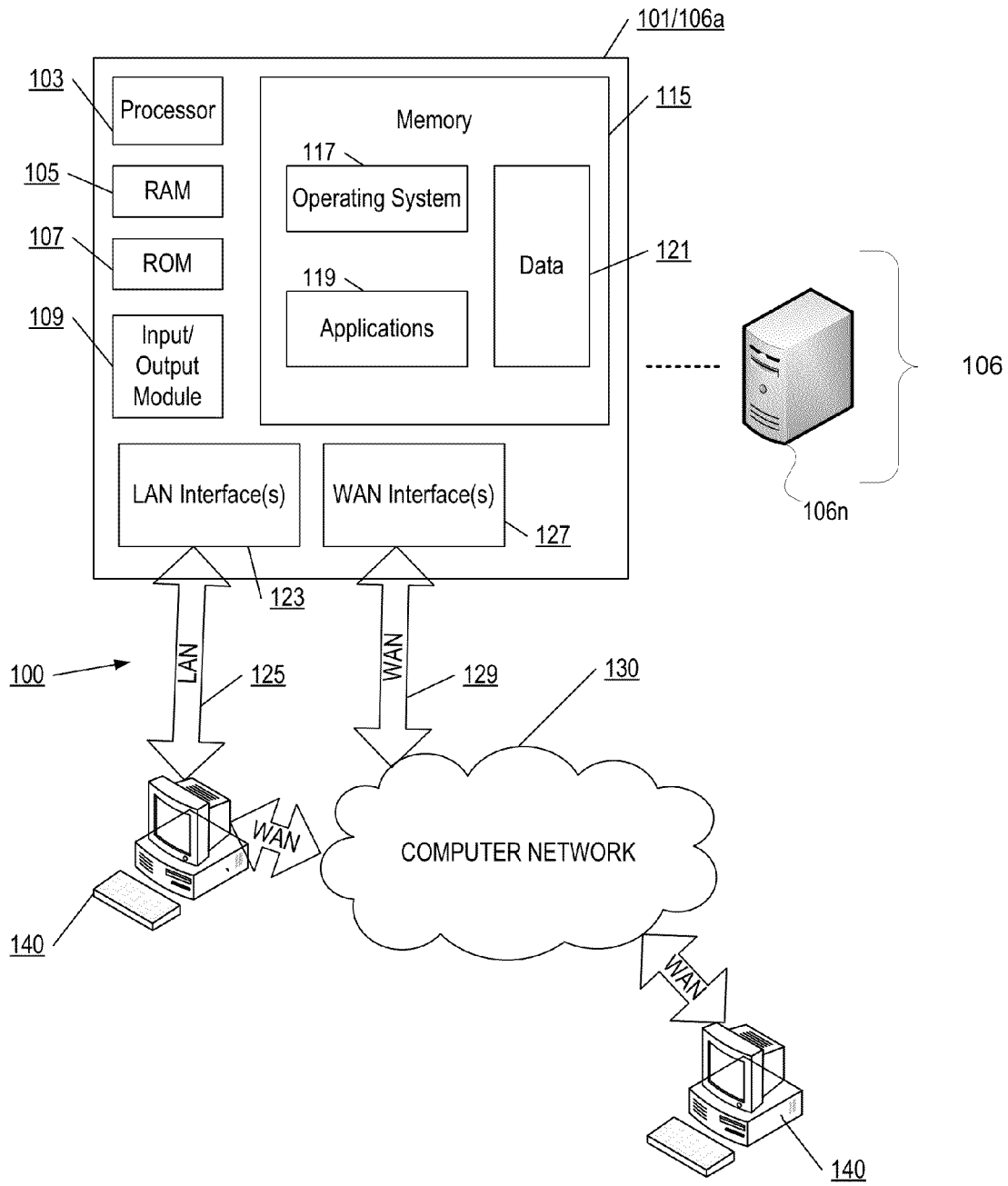

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
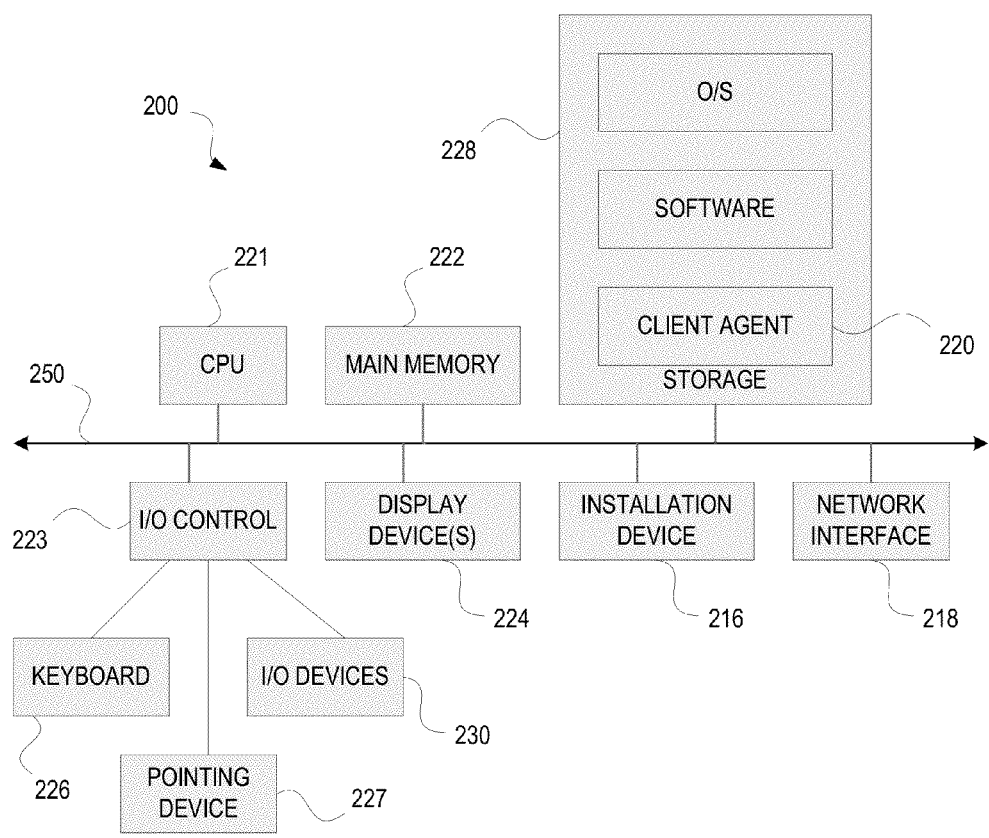

FIG. 2 illustrates a computing device that may be used in accordance with one or more illustrative aspects described herein.

Figure 3:
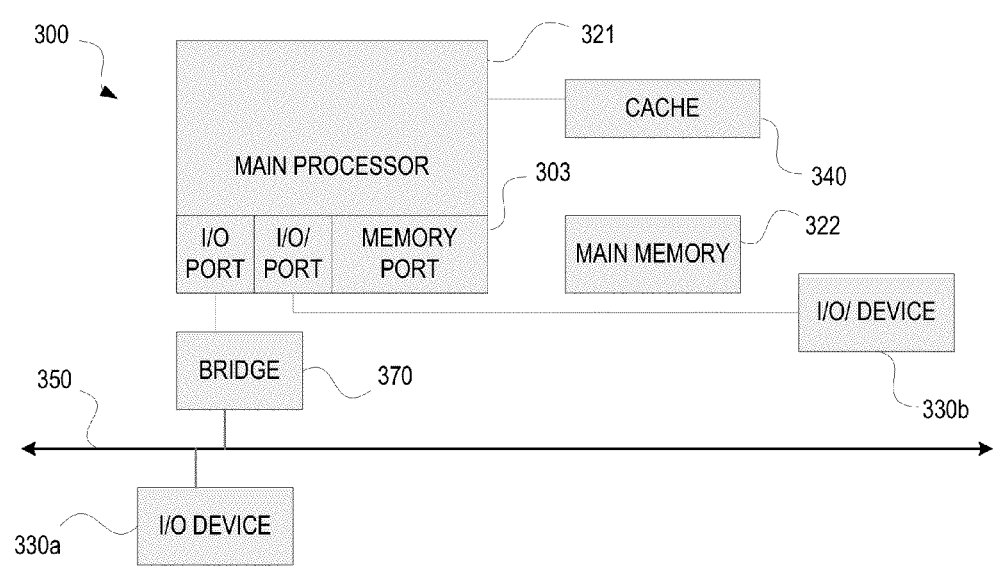

FIG. 3 illustrates a computing device that may be used in accordance with one or more illustrative aspects described herein.

Figure 4:
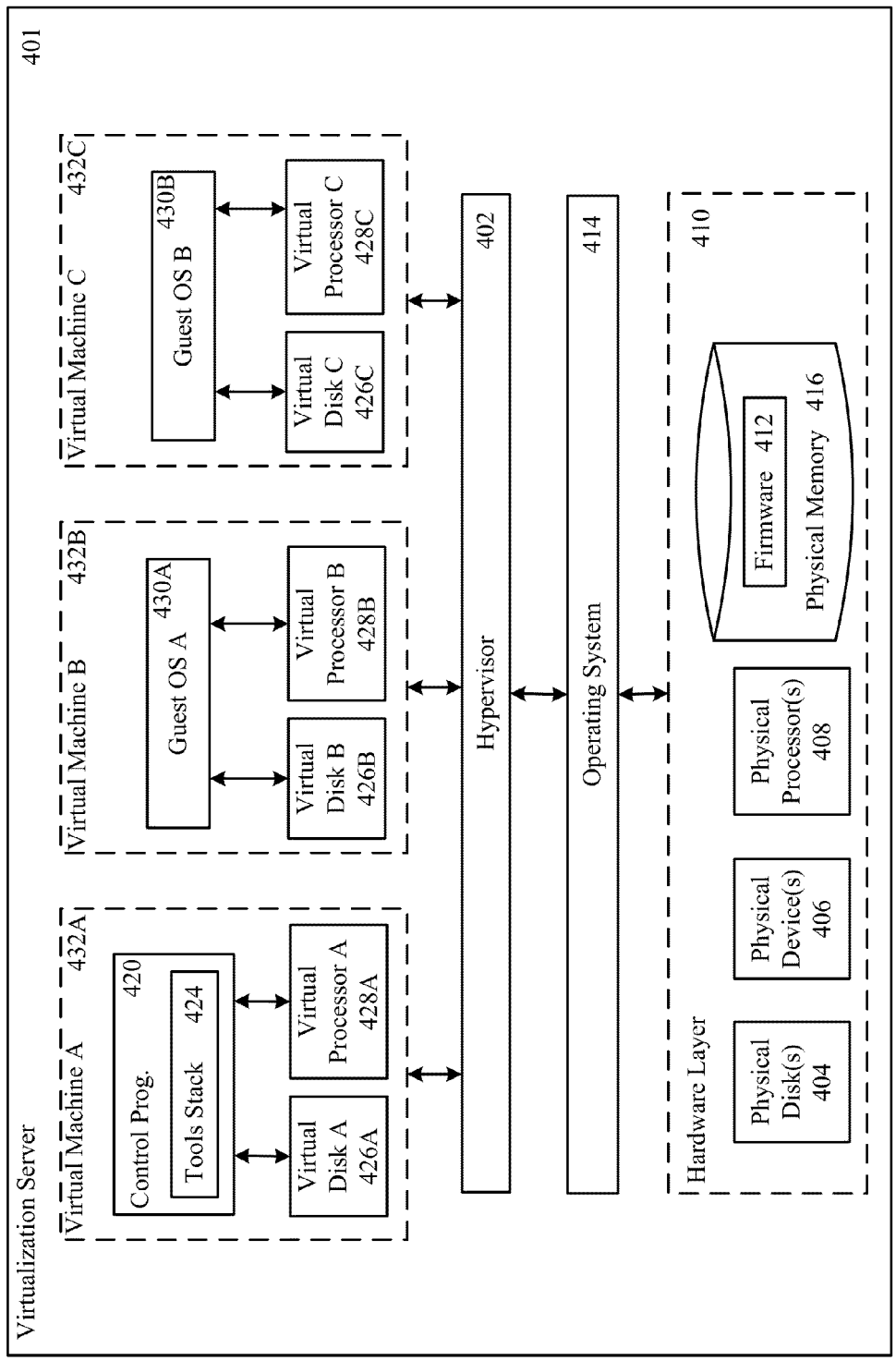

FIG. 4 is a block diagram that depicts embodiments of a virtualization server in accordance with one or more illustrative aspects described herein.

Figure 5:
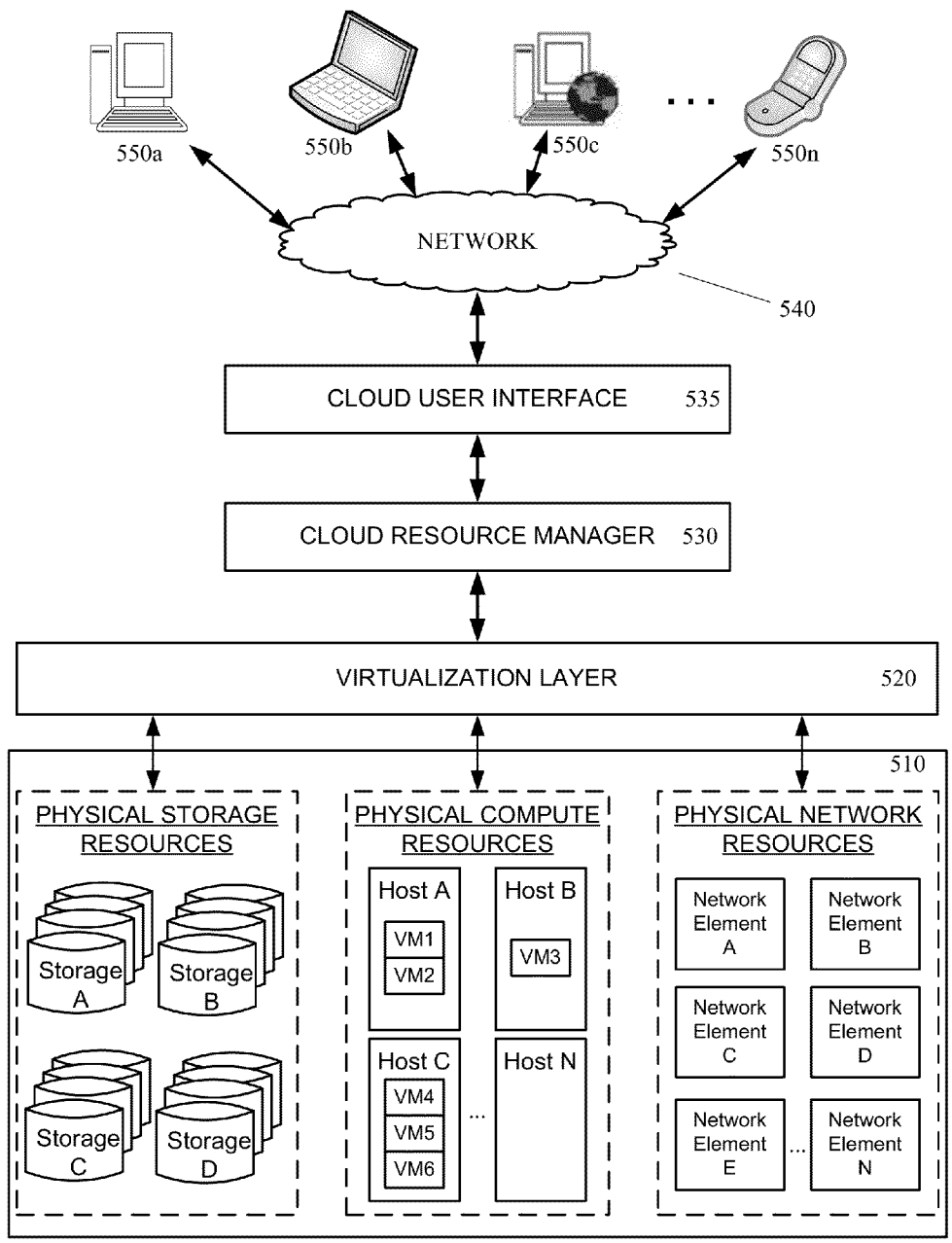

FIG. 5 illustrates a block diagram that depicts embodiments of a cloud computing environment in accordance with one or more illustrative aspects described herein.

Figure 6:
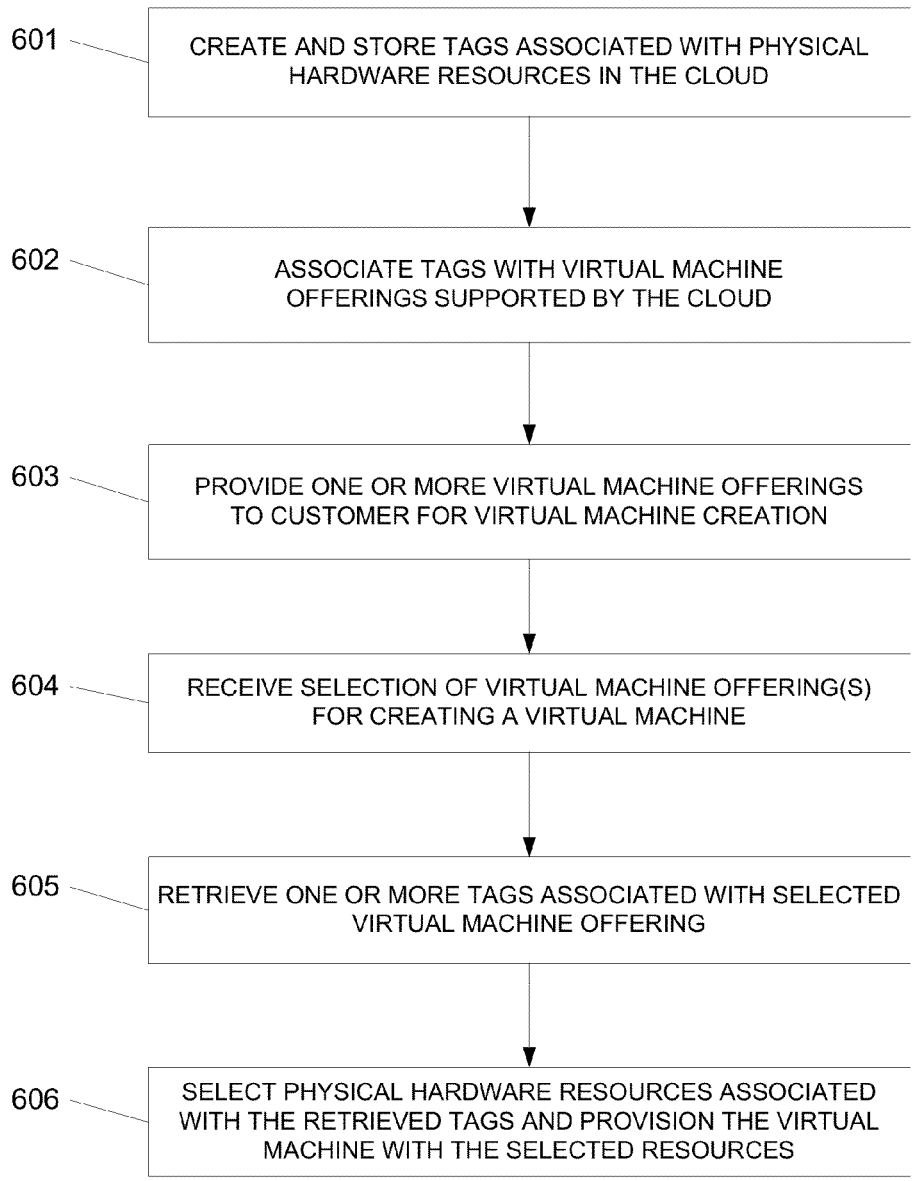

FIG. 6 is a flow diagram illustrating an example process of creating a virtual machine using physical resource tags in a cloud computing environment in accordance with one or more illustrative aspects described herein.

FIGS. 7A and 7B illustrate example tables relating physical resource tags, offerings, and physical resources in a cloud computing environment in accordance with one or more illustrative aspects described herein.

FIG. 7C illustrates an example user interface presenting a set of cloud computing offerings in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Having described in FIGS. 1-3 various examples of desktop virtualization systems, and certain software and functionality that may be included in servers 106 of such systems, the following paragraphs provide additional examples of various methods and systems relating to using physical resource tags to create and provision virtual machines and their operating environments in a cloud computing environment.

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program that executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

Illustrated in FIG. 5 is one embodiment of a cloud computing environment including a cloud system comprising a pool of cloud hardware and software resources 510-530. The cloud system may be configured to provide computing services to clients 550a-550n (generally 550) over a network 540. For example, the cloud system in FIG. 5 may be configured to provision, create, and manage virtual machines and their operating environments (e.g., hypervisors, storage resources, services offered by the network elements, etc.) for customers at client computers 550, over a network 540 (e.g., the Internet), to provide customers with computational resources, data storage services, networking capabilities, and computer platform and application support. Cloud systems also may be configured to provide various specific services, including security systems, development environments, user interfaces, and the like. The cloud hardware and software resources 510-530 may include private and/or public components. For example, a cloud may be configured as a private cloud to be used by one or more particular customers or client computers 550 and/or over a private network 540. In other embodiments, public clouds or hybrid public-private clouds may be used by other customers over an open or hybrid networks 540.

Cloud systems may include an arrangement of various physical hardware components 510, for example, physical computing resources (or compute resources), physical network resources, physical storage resources, switches, and additional hardware resources that may be used to provide cloud computing service to customers. The physical computing resources in a cloud computing environment may include one or more computer servers, such as the virtualization servers 410 described above, which may be configured to create and host virtual machine instances. The physical network resources in a cloud computing environment may include one or more network service providers (i.e., network elements) comprising hardware and/or software which are configured to provide a network service to cloud customers, for example, firewalls, network address translators, load balancers, virtual private network (VPN) gateways, Dynamic Host Configuration Protocol (DHCP) routers, and the like. The storage resources in the cloud system may include storage disks (e.g., solid state drives (SSDs), magnetic hard disks, etc.) and other storage devices.

In certain embodiments, cloud systems may include a virtualization layer 520 with additional hardware and/or software resources configured to create and manage virtual machines and provide other computing services to customers with the physical resources 510 in the cloud. The virtualization layer 520 may include hypervisors, as described above in FIG. 4, along with other specialized components to provide network virtualizations, storage virtualizations, etc. Although FIG. 5 shows the virtualization layer 520 as a separate layer from the physical resource layer 510, in some embodiments these layers may share some or all of the same hardware and/or software resources. For example, the virtualization layer 520 and may include hypervisors installed each of the virtualization servers with the physical computing resources.

The cloud user interface layer 535 may include one or more hardware and software components that provide the interface through which cloud operators or administrators, and cloud customers, interact with the cloud system. For example, the cloud user interface layer 535 may include one or more cloud operator console applications with user interfaces configured to allow cloud operators to manage cloud resources 510, configure the virtualization layer 520, manage customer accounts, and perform other cloud administration tasks. The cloud user interface layer 535 also may include one or more customer console applications with user interfaces configured to receive cloud computing requests from customers via client computers 550, such as, requests to create, modify, or delete virtual machine instances, requests for cloud data storage, network services, etc.

After receiving a customer request via a cloud user interface 535, the cloud resource manager 530 may select and provision physical resources in the hardware layer 510 based on the customer's request. For example, if a cloud customer requests a new instance of a virtual machine, including processing capacity, disk storage, and network capabilities, the resource manager 530 may determine the specific physical virtualization server, physical storage disk(s), and physical network element(s) to use when creating the new virtual machine. The determination of the specific hardware resources may be based on a number of factors, for example, the physical location of the resources (e.g., a zone or datacenter), the performance characteristics of the resources (e.g., speed and reliability), the type of computing service requested (e.g., a virtual web server instance, a virtual application server instance, etc.), the current capacity of the resources (e.g., a number of existing virtual machine instances on the host server, an amount of available disk space on a storage resource), and other factors. After determining the specific hardware resources to be used, the cloud resource manager 530 may communicate with the appropriate components within the virtualization layer 520 to provision and instantiate the new virtual machine and its operating environment, and any other cloud computing requests, using the selected resources. Additionally, in some embodiments, certain physical hardware components 510 (e.g., the physical network resources and physical storage resources) may be configured directly by the cloud resource manager 530, instead of going through the virtualization layer 520. In some instances, the cloud resource manager 530 and/or the cloud virtualization layer 520 may be implemented via a cloud infrastructure platform such as CLOUDSTACK by Citrix Systems or OPENSTACK.

Referring now to FIG. 6, a flowchart is shown illustrating an example method using tags to create a virtual machine instance in a cloud computing environment. A tag refers to an electronic label associated with a specific physical resource (e.g., a virtualization server, storage disk, or network element, etc.) in a cloud computing environment. For example, as shown in FIG. 7A, tags may be stored as individual pieces of data (e.g., under the TAG_ID column) in a database table or other storage within a cloud system. A shown in table 700a, a single tag may be associated with a single physical resource (e.g., TAG_ID="1"), or may be associated with multiple different resources (e.g., TAG_ID="2). Similarly, a single physical resource may be associated with a single tag (e.g., "Storage A"), or may be associated with multiple different tags (e.g., "Host C"). Although these examples describe tags as data stored in a database maintained by the cloud system, in other examples tags may be stored as electronic data on the physical resources themselves (e.g., a device serial number or other resource identifier).

The method shown in FIG. 6 and other similar examples described herein may be performed in a computing environment such as the cloud system illustrated in FIG. 5, as well as other cloud systems having different cloud architectures. As discussed below, the example in FIG. 6 relates to creating a new virtual machine instance based on tags for specific physical hardware resources in the cloud. However, physical resource tagging also may be used for other cloud services, for example, modifying an existing virtual machine instance to change the compute, storage, or network capabilities of the virtual machine, reconfiguring a cloud customer's network of virtual machines, deleting one or more virtual machine instances, etc.

In step 601, one or more of the physical hardware resources in a cloud computing environment may be designated with one or more tags by a cloud operator or administrator. For example, an IT employee, manager, or administrator of a cloud computing system (e.g., running a CLOUDSTACK or OPENSTACK cloud infrastructure platform) may assign different tags to different specific pieces of physical hardware in the cloud environment. Referring to FIG. 7A, this example shows a table 700a containing a set of tags associated with a set physical resources in a cloud computing environment. As illustrated in this example, tags assigned to physical resources may correspond to one or more attributes of those resources. For example, a tag may represent a measure of performance or reliability of the physical resource, the manufacturer of the resource, or the physical installation location of the resource within the cloud, etc. However, tags need not represent attributes of physical resources, but may be assigned by cloud operators or administrators based on any criteria deemed appropriate. Tags may be assigned to physical computing resources (e.g., virtualization servers for hosting), physical storage resources (e.g., storage disks), physical network resource (e.g., network elements), or any other piece of physical hardware in the cloud computing environment. As illustrated in FIG. 7A, in some embodiments multiple tags may be assigned to a single physical resource, and some resources may have no tags assigned.

Physical resource tags may be created and stored in one or more database tables, files, or other storage accessible to the cloud resource manager. For example, a physical resource tag database may be established on a cloud control computer running cloud system software (e.g., CLOUDSTACK). As discussed above, the cloud system software may include one or more cloud operator consoles (e.g., within cloud user interface layer 535) to allow the cloud operator to view, create, modify, and delete tags, and to change the assignments and associations between tags and specific physical resources.

In step 602, one or more of the resource tags created or modified in step 601 may be associated with one or more cloud computing offerings provided by the cloud system. A cloud computing offering as used herein refers to a predetermined combination of one or more computing resources, storage resources, networking resources, and/or other hardware or software resources which may be offered to customers by a cloud operator. In some examples, when a cloud customer connects to the cloud customer console 535 and requests a new virtual machine, the customer console may present a user interface to the customer showing predetermined combinations of virtual machine templates, functional specifications, and/or features which may be selected by the customer, rather than requiring the customer to individually choose every hardware and software feature for the new virtual machine. For example, a first service offering for a small virtual machine may specify a processor speed (e.g., in MHz or GHz) and an amount of memory (e.g., in MB or GB), while a second service offering for a larger virtual machine may specify a faster processor speed and a greater amount of memory. Similarly, a first small disk offering for a new virtual machine may specify an amount of disk space (e.g., in GB) while a second larger disk offering may specify a greater amount of disk space. In some examples, cloud computing offerings (e.g., virtual machine templates, service offerings, disk offerings, network offerings, etc.) may be defined by the cloud operator based on the physical resources available in the cloud, or may be defined by the customer based on the customer's requirements and preferences for virtual machines and other cloud resources, or both.

Associating physical resource tags with cloud computing offerings in step 602 may be performed using one or more database tables, files, or other storage means, similar to the process of assigning tags to physical resources in step 601. For example, a table relating offerings and resource tags may be established on a cloud control computer running cloud system software, and a cloud operator console or other user interfaces may be provided to allow the cloud operator or administrator to view, create, modify, and delete associations between cloud computing offerings and resource tags. Referring to FIG. 7B, this example shows a table 700*b* containing a set of offerings associated with physical resource tags. As illustrated in FIG. 7B, in some embodiments a tag may be associated with multiple offerings, or vice versa, and some offerings may be associated with no tags. Additionally, although the associations between physical resources, tags, and offerings are shown in separate tables in the examples of FIGS. 7A and 7B, other table structures or other storage designs may be used in other examples. For instance, in certain embodiments, physical resources may be tagged within a single table containing an offering column and a physical resource column, without needing a separate tag column and/or multiple related tables.

In step 603, the cloud operator provides one or more virtual machine offerings to a cloud customer. As discussed above, cloud system software (e.g., a cloud infrastructure platform such as CLOUDSTACK, OPENSTACK, etc.) may provide a customer console application or other user interface 535 to allow cloud customers to connect remotely from client machines 550, and to create and manage their virtual machines and other cloud resources. In this example, a customer may connect via a customer console to the cloud system and request that a new virtual machine be created for the customer's organization. In response to the customer's request, the cloud system may retrieve and display to the customer a set of available offerings for the new virtual machine. As noted above, the available offerings may be based on the physical resources in the cloud, the customer's service plan, requirements, preferences (e.g., customer templates, platform requirements, software application requirements, etc.) for virtual machines in the customer's organization. Additionally, as discussed above, although this example relates to creating a new virtual machine, other embodiments may provide similar offerings to customers performing other cloud services, for example, modifying existing virtual machine instances by changing the compute, storage, or network capabilities of the virtual machine, reconfiguring a cloud customer's network of virtual machines, deleting one or more virtual machine instances, etc. Referring to FIG. 7C, this example shows an illustrative user interface 700*c* (e.g., from a customer console application) which displays a set of offerings that may be selected by a customer when creating a new virtual machine.

In step 604, the customer selects one or more offerings for creating the new virtual machine via the customer console or other user interface, and the cloud system receives the selected offerings. For example, a customer may have selected a service offering corresponding to a virtual machine having a processor speed of 4 GHz and 4 GB of memory. Additionally, the customer may have selected a disk offering indicating that the new virtual machine should include 32 GB of disk storage, and a network offering indicating that Dynamic Host Configuration Protocol (DHCP) should be available on the new virtual machine. In some embodiments, these offers may be priced, presented and selected individually, while in other embodiments, combinations of one or more service offerings, disk offerings, and network offerings may be priced and combined into a single offer that may be selected by the customer.

In step 605, the cloud system (e.g., cloud resource manager 530) retrieves one or more resource tags associated with the offering(s) selected by the customer. As discussed above, associations between cloud computing offerings and physical resource tags may be stored in one or more database tables, files, or other storage means accessible to the cloud system software. Thus, retrieving resource tags associated with the selected offering(s) may include accessing a database table containing a relationship between tags and offerings, or another storage where the associations may be maintained. Referring again to the examples shown in FIGS. 7A-7C, if a user selects a first virtual machine offering 705*c* (stored as "OFFER_1"), then in step 605 a single physical resource tag with a TAG_ID of "2" may be retrieved. If the user selects a second virtual machine offering 710*c* (stored as "OFFER_2"), then the two tags having the TAG_ID's "1" and "6" may be retrieved.

In step 606, after retrieving the physical resource tags associated with the selected cloud offering(s), the cloud system software (e.g., cloud resource manager 530) may select a set of physical hardware resources to be used in creating the new virtual machine, and may provision the new virtual machine and its operating environment using the selected physical resources. For example, based on the offering(s) selected by the customer, the cloud resource manager 530 may select a host server from the physical computing resources in the cloud to host the virtual machine, one or more physical storage resources to provide disk storage for the virtual machine, and one or more physical network resources to provide network services for the virtual machine.

In some embodiments, each physical resource selected in step 606 may be selected based on a physical resource tag associated with the offering(s) selected by the customer. Referring again to the examples shown in FIGS. 7A-7C, if the tag having a TAG_ID of "1" is associated with an offering selected with the customer, then in step 606 the host server named "Host A" may be selected based on the tag association in table 700*a* to host the new virtual machine. In another example, if a tag having a TAG_ID of "3" is associated with the selected offering(s), then in step 606 the server "Host B" may be selected to host the new virtual machine, and a Cisco firewall router identified as "Net_Element_A" may be selected to provide firewall services for the new virtual machine. Thus, in certain embodiments, every offering may be associated with one or more tags, and every tag may be associated with one or more physical resources, so that the cloud resource manager 530 may always determine without any ambiguity which specific physical hardware resources should be used to provision each selected cloud computing offering and its operating environment.

However, in certain embodiments, the tags associated with the selected offering(s) might not completely determine the set of physical resources that should be used to provision the selected offering. For example, the tags corresponding to the selected virtual machine offering(s) may be associated with a subset of the physical cloud resources, thus allowing the cloud resource manager 530 to select from the subset to provision the new virtual machine and its operating environment (e.g., hypervisor, storage resources, services offered by the network elements, etc.). Referring to FIGS. 7A-7C, if the customer selects a third service offering (saved as "OFFER_3"), then the associated tags (i.e., TAG_ID's "1" and "5") may allow the cloud resource manager 530 to host the new virtual machine either on "Host A" or "Host C." In such examples, the cloud resource manager 530 may select between the subset of physical resources based on various factors, such as, performance, reliability, price, proximity to other physical resources being used by the same virtual machine or customer, and/or the current capacity of the available physical resources.

In other examples, the tags corresponding to the selected virtual machine offering(s) may be associated with no physical resources for one or more resource types. For instance, referring to FIGS. 7A-7C, if the customer selects a service offering associated with a tag having a TAG_ID of "5," then the cloud resource manager 530 may provision a new virtual machine on "Host C." However, since there are no physical storage or network resources associated with TAG_ID "5", the cloud resource manager 530 may determine the physical storage and network resources for the new virtual machine based on other various factors, as discussed above. In a similar example, if the if the customer selects a storage offering associated with a tag having a TAG_ID of "7", then the cloud resource manager 530 may use "Storage B" for the new virtual machine's disk storage, but may select the physical host server and network elements based on other factors.

In some embodiments, a cloud operator may configure the cloud system software to require physical tag associations for each resource type. In such embodiments, a cloud computing offering (e.g., service offering, storage offering, network offering, etc.) might only be presented to customers if the offering has tag associations to some or all of the necessary physical resources required to provision the offering. For instance, when a cloud operator configures a set of cloud offerings, and associates the cloud offerings with physical resources (e.g., via a cloud operator console 535), the cloud system software may enforce one or more rules by monitoring the associations between offerings, tags, and physical resources in order prevent any conflicts or inconsistencies among the associations. As an example, if a cloud operator attempts to configure a cloud offering to require a two pieces of physical hardware that are incompatible with each other, then the cloud system software may reject the attempted configuration and require the cloud operator to remove or change the tag associations before the offering can be saved and presented to customers.

In some examples, based on the tag associations, it might not be possible to provision a virtual machine and its operating environment (or other cloud offerings) with the proper physical resources at the time the customer selects the offering. For example, referring to FIGS. 7A-7C, if the customer selects offering 705c ("OFFER_1") at a time when the associated virtualization server ("Host B") is offline, or at time when the associated physical storage ("Storage B") is full, then the requested virtual machine and its operating environment potentially cannot be provisioned in accordance with the tag associations. In such examples, the cloud resource manager 530 may be configured to find a closest available resource (e.g., based on performance criteria, reliability, physical location, etc.) to replace any physical hardware that cannot be used to provision the offering. In such examples, the determination of the different set of physical resources to use may be performed automatically and may be transparent to the customer. In other cases, the customer may be notified of the change in physical resources (e.g., new functional parameters, attributes, prices, etc.) and/or may be given an opportunity to select a different offering.

In some embodiments, the cloud system software may monitor the status of the physical resources in the cloud, and may update the tag associations and offerings dynamically based on the availability of the resources. For instance, in the above example, if the physical storage disk "Storage B" is full and cannot currently support any additional virtual machines, then the cloud system software may dynamically update the current set of offerings to remove any offerings that have tag associations with "Storage B." In other examples, the offerings and tag associations may be dynamically updated to replace "Storage B" with another available storage disk. In such examples, when an originally tagged physical resource (e.g., server, storage disk, network element) becomes available once again, the cloud software may detect the change and update the offerings and tag associations to refer to the originally tagged resource.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. One or more non-transitory computer-readable media, storing computer-executable instructions that, when executed by a processor, cause a computing device to:
    receive a request to create a virtual machine in a cloud computing environment;
    receive a selection of a virtual machine offering associated with the request, the selected virtual machine offering comprising at least a set of desired characteristics for a host computing device of the requested virtual machine and a set of desired characteristics for one or more network elements to provide networking capabilities for the requested virtual machine;
    in response to the selection of the virtual machine offering, access a storage storing one or more physical resource tags, each of the one or more physical resource tags comprising an electronic label associated with one or more virtual machine offerings and one or more specific physical resources in the cloud computing environment;
    retrieve, from the storage, one or more identifiers of specific physical resources in the cloud computing environment, based on an identifier of the selected virtual machine offering, wherein retrieving the one or more identifiers of the specific physical resources comprises:
        using the identifier of the selected virtual machine offering to retrieve one or more physical resource tags from a first table storing associations between virtual machine offerings and physical resource tags; and
        using the one or more physical resource tags retrieved from the first table to retrieve the one or more identifiers of the specific physical resources from a second table storing associations between physical resource tags and specific physical resources in the cloud computing environment, wherein within the second table, a first physical resource tag is associated with multiple different physical resources in the cloud computing environment; and provision a first virtual machine corresponding to the request, using the one or more specific physical resources.

2. The one or more non-transitory computer-readable media of claim 1, storing further computer-executable instructions that, when executed by the processor, cause the computing device to:
    display, after receiving the request, a plurality of virtual machine offerings for creating the requested virtual machine, the plurality of virtual machine offerings comprising a first offering that is associated in the storage with a first set of identifiers of a first set of specific physical resources, and a second offering that is associated in the storage with a second set of identifiers of a second set of specific physical resources.

3. The one or more non-transitory computer-readable media of claim 2, wherein displaying the first offering and the second offering comprises displaying at least one of a manufacturer, physical location, or indication of reliability for at least one specific physical resource in the first set and second set of specific physical resources.

4. The one or more non-transitory computer-readable media of claim 3, wherein the first offering and the second offering are priced based on the at least one manufacturer, physical location, or indication of reliability for at least one specific physical resource in the first set and second set of specific physical resources.

5. The one or more non-transitory computer-readable media of claim 1, storing further computer-executable instructions that, when executed by the processor, cause the computing device to:
    determine, after receiving the request, at least one specific physical resource within the cloud computing environment having at least a threshold level of current resource capacity;
    identify a first set of physical resource tags associated with the at least one specific physical resource having at least the threshold level of current resource capacity;
    retrieve from the storage a first set of virtual machine offerings for creating the requested virtual machine, based on the first set of physical resource tags; and
    display the first set of virtual machine offerings.

6. The one or more non-transitory computer-readable media of claim 1, wherein within the storage, at least one virtual machine offering is not associated with any of the physical resource tags.

7. The one or more non-transitory computer-readable media of claim 1, wherein a first physical resource tag in the first table and the second table corresponds to a manufacturer of one or more of the specific physical resources in the second table.

8. The one or more non-transitory computer-readable media of claim 1, wherein a first physical resource tag in the first table and the second table corresponds to an indication of reliability of one or more of the specific physical resources in the second table.

9. A method comprising:
    receiving, at a first cloud infrastructure computing device, a request to create a virtual machine in a cloud computing environment;
    receiving, at the first cloud infrastructure computing device, a selection of a virtual machine offering associated with the request, the selected virtual machine offering comprising at least a set of desired characteristics for a host computing device of the requested virtual machine and a set of desired characteristics for one or more network elements to provide networking capabilities for the requested virtual machine;
    accessing, by the first cloud infrastructure computing device, a storage storing one or more physical resource tags, each of the one or more physical resource tags comprising an electronic label associated with one or more virtual machine offerings and one or more specific physical resources in the cloud computing environment, in response to the selection of the virtual machine offering;
    retrieving, from the storage, one or more identifiers of specific physical resources in the cloud computing environment, based on an identifier of the selected virtual machine offering, wherein retrieving the one or more identifiers comprises:
        using the identifier of the selected virtual machine offering to retrieve one or more physical resource tags from a first table storing associations between virtual machine offerings and physical resource tags; and
        using the one or more physical resource tags retrieved from the first table to retrieve the one or more identifiers of the specific physical resources from a second table storing associations between physical resource tags and specific physical resources in the cloud computing environment, wherein within the second table, a first physical resource tag is associated with multiple different physical resources in the cloud computing environment; and
    provisioning, by the first cloud infrastructure computing device, a first virtual machine corresponding to the request, using the one or more specific physical resources.

10. The method of claim 9, further comprising:
    after receiving the request, displaying a plurality of virtual machine offerings for creating the requested virtual machine, the plurality of virtual machine offerings comprising a first offering that is associated in the storage with a first set of identifiers of a first set of specific physical resources, and a second offering that is associated in the storage with a second set of identifiers of a second set of specific physical resources.

11. The method of claim 10, wherein displaying the first offering and the second offering comprises displaying at least one of a manufacturer, physical location, or indication of reliability for at least one specific physical resource in the first set and second set of specific physical resources.

12. The method of claim 11, wherein the first offering and the second offering are priced based on the at least one manufacturer, physical location, or indication of reliability for at least one specific physical resource in the first set and second set of specific physical resources.

13. The method of claim 9, further comprising:
    after receiving the request, determining at least one specific physical resource within the cloud computing environment having at least a threshold level of current resource capacity;
    identifying a first set of physical resource tags associated with the at least one specific physical resource having at least the threshold level of current resource capacity;
    retrieving from the storage a first set of virtual machine offerings for creating the requested virtual machine, based on the first set of physical resource tags; and
    displaying the first set of virtual machine offerings.

14. The method of claim 9, wherein within the storage, at least one virtual machine offering is not associated with any of the physical resource tags.

15. An apparatus comprising:
a processor controlling at least some operations of the apparatus; and
a memory storing computer executable instructions that, when executed by the processor, cause the apparatus to:
  receive a request to create a virtual machine in a cloud computing environment;
  receive a selection of a virtual machine offering associated with the request, the selected virtual machine offering comprising at least a set of desired characteristics for a host computing device of the requested virtual machine and a set of desired characteristics for one or more network elements to provide networking capabilities for the requested virtual machine;
  in response to the selection of the virtual machine offering, access a storage storing one or more physical resource tags, each of the physical resource tags comprising an electronic label associated with one or more virtual machine offerings and one or more specific physical resources in the cloud computing environment;
  retrieve, from the storage, one or more identifiers of specific physical resources in the cloud computing environment, based on an identifier of the selected virtual machine offering, wherein retrieving the one or more identifiers of the specific physical resources comprises:
    using the identifier of the selected virtual machine offering to retrieve one or more physical resource tags from a first table storing associations between virtual machine offerings and physical resource tags; and
    using the one or more physical resource tags retrieved from the first table to retrieve the one or more identifiers of the specific physical resources from a second table storing associations between physical resource tags and specific physical resources in the cloud computing environment, wherein within the second table, a first physical resource tag is associated with multiple different physical resources in the cloud computing environment; and
  provision a first virtual machine corresponding to the request, using the one or more specific physical resources.

16. The apparatus of claim 15, the memory storing further computer executable instructions that, when executed by the processor, cause the apparatus to:
  display, after receiving the request, a plurality of virtual machine offerings for creating the requested virtual machine, the plurality of virtual machine offerings comprising a first offering that is associated in the storage with a first set of identifiers of a first set of specific physical resources, and a second offering that is associated in the storage with a second set of identifiers of a second set of specific physical resources.

17. The apparatus of claim 15, the memory storing further computer executable instructions that, when executed by the processor, cause the apparatus to:
  determine, after receiving the request, at least one specific physical resource within the cloud computing environment having at least a threshold level of current resource capacity;
  identify a first set of physical resource tags associated with the at least one specific physical resource having at least the threshold level of current resource capacity;
  retrieve from the storage a first set of virtual machine offerings for creating the requested virtual machine, based on the first set of physical resource tags; and
  display the first set of virtual machine offerings.

18. The apparatus of claim 15, wherein within the storage, at least one virtual machine offering is not associated with any of the physical resource tags.

\* \* \* \* \*